UNITED STATES PATENT OFFICE.

FREDERICK K. FISH, JR., OF SAN FRANCISCO, CALIFORNIA, ASSIGNOR TO WOOD PRODUCTS AND BY-PRODUCTS CORPORATION, OF RENO, NEVADA, A CORPORATION OF NEVADA.

PROCESS OF MAKING PAPER PULP FROM WOOD.

1,413,716.     Specification of Letters Patent.     Patented Apr. 25, 1922.

No Drawing. Application filed February 8, 1919, Serial No. 275,873. Renewed September 13, 1921. Serial No. 500,436.

*To all whom it may concern:*

Be it known that I, FREDERICK K. FISH, Jr., a citizen of the United States of America, residing at San Francisco, in the county of San Francisco and State of California, have invented certain new and useful Improvements in Processes of Making Paper Pulp from Wood, of which the following is a specification.

This invention relates to improvements in a process for manufacturing paper pulp.

It has long been recognized that it is difficult to remove certain constituents from wood, which cause stains to appear in paper manufactured from wood pulp, and it is one of the objects of this invention to provide a series of steps for so treating the wood as to produce a wood pulp which will be substantially free of the staining constituents.

Among other elements, wood contains water soluble constituents, and constituents which are insoluble in water, but soluble in chemicals. In carrying out my present invention, I propose to arrange the various steps of the process, with a view of separately dissolving and removing the two classes of constituents to avoid same being mixed or intermingled and creating a chemical reaction which produces stains in the pulp.

The wood is cut into small chips, and these chips are saturated with steam, or what is known as "sweating." The difference between the internal temperature of the wood chips, and the temperature around same when steam is introduced, causes the moisture to appear on the surface. This sweating of the wood softens the structure throughout and enlarges the fibers and prepares same for the subsequent steps in the process. After the chips are subjected to the action of the steam a sufficient time to thoroughly soften the structure, the chips are then placed in a container, and the latter is sealed. The chips contain moisture, and the internal temperature is considerably above atmospheric, and while in this condition, a partial vacuum is created in the container to withdraw the moisture and air, and otherwise open up the cellular structure. The vacuum is broken by the introduction of super-heated water into the container to submerge the chips. The water is preferably previously super-heated to at once quickly act on the chips when introduced in the container.

The pressure and dissolving properties incident to the super-heated water and the pressure within the wood being below atmospheric, causes the water to thoroughly penetrate the wood structure down to the cell walls and attack the sap globules, and the highly heated water under pressure, readily dissolves and removes the water soluble constituents in the chips. These dissolved constituents become intermingled with and are held in suspension and emulsion in the water, and their removal from chips gives place for the heated water, and the melted resins. The water forced into the chips melts the resins, and thereby causes them to become displaced from their natural locations, and renders them more susceptible to future treatment.

The chips are treated in the super-heated water until the water soluble constituents have been dissolved and removed, and the contained resins melted, and the woody structure is further softened. This results from the combined action of heat, pressure and water, all which are essential to prepare the chips for the treatment which follows.

The super-heated water is removed from the container, and a partial vacuum is created, to withdraw the moisture from the chips. The chips at the time the water is withdrawn, are highly heated and contain moisture, which is charged with the vapors or gases produced by the water acting on the soluble constituents. The vacuum acts to withdraw moisture, and leaves the chips free of the water soluble constituents. The melted and dislodged resins are therefore caused to spread in the wood structure, and are therefore made in better condition to be treated.

The vacuum is broken, by quickly introducing a chemical digesting acid solution at about the temperature of the chips, to the container, and the chips are again submerged. This solution acts to dissolve and remove the resins and remaining associated constituents of the chips. The water soluble constituents having been previously removed by superheated water and the woody structure opened up, the chemical digesting solution will readily penetrate the fibrous structure and quickly act to dissolve and remove the resins.

By first removing the water soluble constituents, a weaker digesting solution to dissolve and remove the resins may be employed than heretofore, and better results obtained in less time than heretofore.

While the chips are being subjected to the treatment of the chemical digesting solution, pressure is applied to force the liquid into the wood structure for sufficient time to dissolve and remove the lignin and resins and like constituents subject to the action of the liquid content of the mixture. This step having been completed, the digesting solution is withdrawn from the container and returned to a tank to be used in a future similar application on another charge of chips.

The digesting solution is withdrawn as quickly as possible to take advantage of the internal heat of the chips, and cold water is introduced into the container sufficient to submerge the chips, an outlet being provided for the escape of the air until the container is filled with the water, whereupon the outlet is closed. The temperature of the water will be raised by the heated condition of the container and the chips, and as the container is closed, pressure is created by the expansion of the water. This pressure causes the water to thoroughly penetrate the fibers of the whole chip structure and removes or washes out any of the chemical digesting solution which may be left in or around the chips. It is at this point that the water is effective, in that by this final washing the residue of the chemical digesting solution is removed, for any portion of it remaining in or on the chips acts as an anti-chlor and destroys the bleaching liquor.

After the chips have been subjected to the water under pressure, the chips are removed and may be further washed and bleached by any well known process.

By the time the chips are subjected to the foregoing steps, the constituents such as those which may be dissolved in water, as well as the lignin and resins are removed and the chips are reduced to a pulp entirely free of substances which are liable to stain the final product. This result is quickly obtained, and is accomplished in a short space of time as compared with known processes employed in the manufacture of wood pulp.

By actual experiments it has been determined that the water soluble constituents in the wood can be effectually dissolved and removed, and the structure opened up and the resins and the like constituents melted by the action of heat, water and pressure, without removing the resins, and without deteriorating the fibers. It has furthermore been demonstrated that by first attacking the water soluble constituents and thereafter attacking the resins and remaining associated constituents of the chips, by a dissolving agent, a more effective result can be obtained and a much weaker, hence less expensive solution may be employed, and a much better product produced. Each step in the process acts to accomplish a specific purpose without in anywise weakening the wood fibre and the secondary chemical reactions and formation of certain acid and tar-like substances incident to treatment of the chips in one solution are eliminated.

A pulp produced by the foregoing process is free of elements and constituents which cause subsequent staining of the paper.

What I claim is:

1. The process of manufacturing paper pulp comprising treating the wood stock in a fixed body of water in a sealed container to dissolve and remove the water soluble constituents and at the same time melt certain of the constituents which are not dissolvable in water, thereafter treating the wood stock in a sealed enclosure to a fixed body of liquid to dissolve and remove the resins and like constituents, and then washing the wood stock in water under pressure.

2. The process of producing paper pulp from wood, comprising treating the wood including subjecting the wood to a fixed body of superheated water to remove the water soluble constituents and soften constituents insoluble in water, thereafter subjecting the wood to a digesting chemical solution under pressure to dissolve and remove the contained constituents previously softened, withdrawing the digesting chemical solution, and then subjecting the wood stock to water under pressure to wash out the residue of the chemical solution.

3. The process of introducing paper pulp from wood, comprising submerging wood chips in a fixed body of super-heated water under pressure to dissolve and remove water soluble constituents and melt the resins, removing the water, then subjecting the chips to the action of a vacuum to withdraw a portion of the moisture, thereafter submerging the chips in a digesting chemical solution which will dissolve and remove the constituents which were not dissolvable in water, and then washing the wood stock in water.

4. The process of producing paper pulp from chips, comprising sweating the chips to soften same, then subjecting the chips to a vacuum to withdraw moisture and open up the structure, then submerging the chips in a confined body of heated water under pressure to dissolve and remove water soluble constituents, and melt the resins, then removing the water, thereafter submerging the softened chips in a digesting chemical solution to dissolve and remove the resins, and then subjecting the product to water under pressure to wash out any remaining digesting chemical solution.

5. The process of producing paper pulp from chips, comprising sweating the chips to soften the same, then treating the chips to remove water soluble constituents and melt the resins thereafter treating the chips in a fixed body of heated digesting chemical solution under pressure to remove the resins withdrawing the solution, then submerging the product in cold water under pressure, the contained heat in the product increasing the temperature of the water and creating pressure around the product which causes the water to penetrate the product and wash out any remaining solution.

6. The process of producing paper pulp from chips, comprising sweating the chips to soften same, then subjecting the chips to a vacuum to open up the structure, then submerging the chips in super-heated water to dissolve and remove the water soluble constituents and melt the resins, then treating the chips to a vacuum to withdraw a portion of the moisture, then to a digesting chemical solution about the temperature of the chips to remove the resins and simultaneously create pressure around the chips, removing the digesting chemical solution, and then submerging the product in water and simultaneously creating pressure to force the water into the product to wash out any of the solution remaining in the product.

In testimony whereof I affix my signature.

FREDERICK K. FISH, Jr.